United States Patent Office 3,663,490
Patented May 16, 1972

3,663,490
ACRYLIC ACID-ACRYLAMIDE-DIACETONE ACRYLAMIDE TERPOLYMER
Amir M. Sarem, Yorba Linda, Calif., assignor to Union Oil Company of California, Los Angeles, Calif.
No Drawing. Original application Dec. 21, 1967, Ser. No. 692,383, now Patent No. 3,476,186. Divided and this application July 28, 1969, Ser. No. 845,492
Int. Cl. C08f 15/40
U.S. Cl. 260—29.6 TA
17 Claims

ABSTRACT OF THE DISCLOSURE

A novel water-soluble terpolymer of acrylic acid, acrylamide and diacetone acrylamide useful as a flood water additive and a method for preparing the polymer in which the monomers are copolymerized in the presence of an organoboron catalyst.

---

This is a division of application Ser. No. 692,383 filed Dec. 21, 1967, and now issued as Pat. No. 3,476,186.

This invention relates to water-soluble polymers, and more particularly concerns novel acrylic acid-acrylamide-diacetone acrylamide copolymers and methods of preparing these copolymers.

In the secondary recovery of petroleum by water flooding, it has been proposed to employ aqueous media rendered more viscous than ordinary water or brine by the incorporation therein of water-soluble agents such as water-soluble organic polymers. It has been found that polymeric compositions containing amide and carboxyl or carboxylate groups are useful as thickening agents to render aqueous flooding media employed in the recovery of petroleum by water flooding more viscous than ordinary water or brine. These polymers can be prepared by copolymerizing acrylamide and acrylic acid or by the controlled hydrolysis of polyacrylamide. In the first of these methods, a mixture of acrylamide and acrylic acid monomers are reacted in aqueous solution, usually in the presence of a polymerization initiator and an activator. The resulting product is an acrylic acid-acrylamide copolymer containing amide and carboxyl groups which can be further neutralized with a suitable alkaline material. While this procedure provides a relatively simple and inexpensive method for producing a polymeric composition containing amide and carboxyl groups, it does not yield the relatively high molecular weight polymers which are particularly desirable as thickening agents for flood water and for certain other uses.

For these reasons, it has been suggested that suitable water-soluble polymers be prepared by polymerizing acrylamide to obtain a polyacrylamide of the desired degree of polymerization and then partially hydrolyzing the resulting polyacrylamide to obtain a polymeric material having the proper proportion of amide and carboxyl groups. In a heretofore preferred mode of preparation, a polymer is produced by polymerizing acrylamide under controlled temperature conditions in an aqueous medium containing sodium carbonate and a polymerization catalyst, such as organic and inorganic peroxides and hydroperoxides, and salts of inorganic per-acids. Although this process is known to produce a polymer characterized by a high degree of water-solubility, by relatively high molecular weight and by uniformity of hydrolysis, it has nevertheless been only marginally successful, partly because of the high cost of producing the polymer, despite relatively low raw material costs, and partly because of the limited improvement in oil recovery obtained by a water flood thickened with this polymer.

Another problem encountered in the use of prior art water-soluble thickening agents is that the complexity of their manufacture generally prohibits their production at the well site. Thus, although these polymers are usually produced in aqueous solution, they are dehydrated and marketed as particulated solids. The solid polymer is then transported to a field location whereupon it redissolved prior to use. However, the solid polymers are generally difficult to redissolve or redisperse in water, often requiring excessive mixing to obtain homogeneous solution. Also, the resulting polymer solution must be strained or filtered to remove undissolved solids that would cause plugging of the formation on injection. This is both wasteful of polymer and time consuming. Not only is additional processing cost involved in manufacturing the particulated solid polymer and subsequently redissolving it in water to provide the aqueous flooding solution, but often the polymer also suffers some quality degradation during dehydration and storage.

Accordingly, it is a principal object of this invention to provide an improved water-soluble polymer. Another object of the invention is to provide an improved agent for thickening an aqueous flooding medium. Still another object of the invention is to provide an improved method for preparing a water-soluble polymer. Yet another object is to provide an improved method of preparing an improved agent for thickening an aqueous medium. Other objects and advantages of the invention will be apparent from the following description.

More specifically the novel polymeric agents in accordance with this invention are substantially linear, water-soluble polymers having amide, carboxyl and diacetone substituted amide groups arranged along a substantially carbon-carbon chain. The term "acrylic acid-acrylamide-diacetone acrylamide terpolymer," as employed herein, is inclusive of the hydrolyzed polymer wherein the carboxyl groups are in the acid form and also of such polymers wherein the carboxyl groups are in the salt form. Thus, for example, the terpolymer may exist in the hydrolyzed form wherein the carboxyl groups are hydrolyzed to acids, or wherein the carboxyl groups are in the form of salts of ammonium, alkali metal, alkaline earth metal and the like. Although the length of the molecular chain and the proportion and distribution of amide, carboxyl and diacetone substituted amide groups are variable, the terpolymers of this invention are characterized by the generalized formula

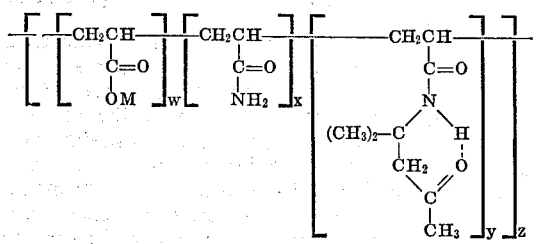

wherein M is a cation and can be hydrogen, ammonium, alkali metal, alkaline earth metal, or other metal that will replace hydrogen to form a carboxylate salt; and wherein $w$, $x$ and $y$ represent respectively the average number of acrylic acid monomer units, acrylamide monomer units and diacetone acrylamide monomer units in the polymer per 100 monomer units of the polymer. The molar proportion of acrylic acid monomer in the polymer is thus represented by the fraction $w/100$, the proportion of acrylamide by the fraction $x/100$, and the proportion of diacetone acrylamide by the fraction y/100, and the sum of w, x and y equals 100. The subscript z represents the average number of 100 monomer units in the polymer. The diacetone acrylamide group has been shown in the form of a ring structure. However, the bonding or association between the hydrogen and the keto oxygen is relatively weak, and it is to be understood that the diacetone group may be in the form of a linear chain.

The proportions of the various monomer units in the polymer, their distribution along the carbon-carbon chain, and the length of the chain can vary over a wide range, thereby providing a family of polymers having different molecular weights and water solubilities, and differing in other important properties which render certain of these polymers particularly suited for specific applications. Thus, while the composition and structure of the polymers of this invention can vary over wide ranges, it has nevertheless been found that a number of useful acrylic acid-acrylamide-diacetone acrylamide copolymers can be defined by the foregoing generalized formula wherein $w$ is from about 10–50, $x$ is from about 25–85, $y$ is from about 1–25, and $z$ varies up to about 8,000.

A material that possesses superior properties as a thickening agent for flood water is an acrylic acid-acrylamide-diacetone acrylamide terpolymer according to the foregoing generalized formula wherein $w$ is from about 15–35, $x$ is from about 45–80, and $y$ is from about 2–15. Further, to prevent a loss in water solubility, the cation ion M is preferably a monovalent cation such as hydrogen, ammonium, or an alkali metal such as sodium, potassium, lithium, rubidium and cesium.

The terpolymers in accordance with the present invention that are particularly useful as flood water additives are characterized by high molecular weight and the ability to increase the viscosity and reluctance to flow of aqueous solutions of the polymer. As a result, it is possible to obtain aqueous solutions having a desirably increased viscosity and reluctance to flow with the use of a minimum amount of polymeric ingredient. The terpolymers found useful as flooding agents are characterized by average molecular weights of at least 500,000 and molecular weights of 1,000,000 or more are preferred, with some of the more preferred polymers having molecular weights up to 40,000,000 or more. The molecular weight of the terpolymer is correlated with the viscosity of a standard solution of the polymer under controlled conditions. Accordingly, it has been found that the terpolymers preferred for use as flood water additives are those characterized by a viscosity of at least 3 centipoises for a 0.05 percent by weight solution thereof in an aqueous 3 percent by weight sodium chloride solution at a temperature of 25° C. as determined by a Brookfield viscosimeter equipped with a UL adapter spindle and operated at a speed of 30 r.p.m.

The polymers of this invention are also characterized by their ability in dilute solution to decrease the mobility of the solution in porous media below that expected from a consideration of the solution viscosity. This characteristic of high reluctance to flow in porus media can be quantified by the resistance factor which is defined as the ratio of the mobility of a brine solution to the mobility of the polymer solution in a permeable body having residual oil saturation. This relationship can be expressed as:

$$R = \frac{\lambda_w}{\lambda_p} = \frac{\left(\frac{k_w}{\mu_w}\right)}{\left(\frac{k_p}{\mu_p}\right)}$$

wherein

R = resistance factor
$\lambda_w$ = mobility of brine
$\lambda_p$ = mobility of polymer solution $k_w$ = permeability to brine, darcies
$k_p$ = permeability to polymer solution, darcies
$\mu_w$ = viscosity of brine, cp.
$\mu_p$ = viscosity of polymer solution, cp.

The resistance factor can be determined by measuring the flow rate of brine and the polymer solution through a porous member and calculating the resistance factor as the ratio of the measured flow rates at equal pressure drop. Accordingly, it has been found that the terpolymers of this invention preferred for use as water flooding additives are those characterized by resistance factors above about 15 for a 0.05 percent by weight solution of the polymer in a 3 percent by weight solution of sodium chloride at 25° C.

The acrylic acid-acrylamide-diacetone acrylamide terpolymers in accordance with this invention are prepared by copolymerizing acrylic acid, acrylamide and diacetone acrylamide in aqueous solution with an organoboron catalyst. Diacetone acrylamide, also known as (N[2-(2-methyl-4-oxopentyl)]-acrylamide), is a water-soluble substituted acrylamide that can be prepared by the reaction of acrylamide and diacetone alcohol in the following manner:

$$CH_2CHCONH_2 + CH_3COCH_2C(CH_3)_2OH \rightarrow$$
$$CH_2CHCONHC(CH_3)_2CH_2COCH_3 + H_2O$$

An aqueous solution of the monomers is prepared and polymerization initiated by the addition of organoboron catalyst. The resulting polymeric product is a viscous liquid or a gel comprising a substantially linear water-soluble copolymer having a minimum of cross-linking and which possesses superior water thickening and other desirable properties, these properties being to some extent controlled by the selection of monomer proportions and the reaction conditions.

The polymerization catalysts useful in the practice of this invention are organoboron compounds, and particularly organoboron compounds having the following generalized formula

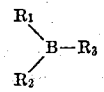

wherein $R_1$, $R_2$ and $R_3$ are alkyl radicals, and preferably are alkyl radicals having less than about four carbon atoms in the alkyl group. Thus, the preferred catalysts of this invention comprise a group of trialkylboron compounds having methyl, ethyl, propyl, butyl and iso-butyl substituent groups. These compounds can be mixed alkylborons in that two or more different alkyl groups are contained in the molecule, or the alkyl groups can be the same. Exemplary of this latter class of compounds are trimethylboron, triethylboron, tripropylboron, tri(n-butyl) boron and tri(isobutyl)boron. Further, it is within the scope of this invention to employ a mixture of the foregoing trialkylboron compounds as the catalytic polymerization agent. Also, various boronous anhydrides and boronites exhibit the requisite catalytic properties and can be used to prepare the terpolymer compositions of this invention.

While the exact mechanism of the polymerization reaction of this invention is not clearly understood, it is believed that the reaction is of the free radical type initiated by a peroxide formed by the reaction of organoboron with trace quantities of oxygen. The organoboro is also believed to complex with the free radical at the end of the polymer chain in such a way that termination of the reaction becomes less likely, resulting in the formation of polymers having molecular weights higher than would be produced in the absence of the organoboro compound. Further, the organoboron catalyzed reaction may result in a polymer having a different composition or a different distribution of substituent groups along the polymer chain than would be obtained by other methods of polymerization. Thus, while I do not desire to be held to any particular theory of operation, it has nevertheless been demonstrated that polymer compositions prepared by the method of this invention are superior in many important properties to those prepared by the heretofore known techniques.

Although the presence of trace quantities of oxygen are believed necessary to initiate the free radical polymerization reaction, the presence of excess oxygen terminates the polymerization reaction prematurely, thus resulting in a lower molecular weight polymer product. While, in a preferred embodiment of this invention, it is desirable that excess oxygen be removed prior to initiating the reaction, polymerization with organoborons may be successful even though a relatively large quantity of oxygen is initially present in the reaction mixture since most of the oxygen is consumed by reaction with the organoboron to produce more highly oxidized boron compounds which are not effective is providing free radicals. Thus, it is within the scope of this invention to control the amount of oxygen in contact with the reactant solution during the polymerization reaction. Oxygen can be controlled to suitable levels by evacuating and purging the reaction vessel of air prior to initiating the polymerization reaction to remove the excess undissolved oxygen from the system, the optimum content of oxygen dissolved in the reactant solution being a molar concentration about equal to the molar concentration of the organoboron compound present. Thus, it is preferred in most applications that the reactant monomer solution contain between about 15 and about 600 p.p.m. of dissolved oxygen based on the monomer content of thte solution. Excess dissolved oxygen can be removed from the reactant solution, if desired. Conversely, in those cases where the reaction mixture is totally devoid of the necessary quantity of oxygen to initiate the free radical reaction, it is within the scope of this invention to add oxygen to the reaction mixture.

The polymerization of the acrylic monomers usually can be initiated at room temperature although some mild heating may be necessary in certain polymerization reactions. These reactions are exothermic and are accompanied by a release of heat causing an increase in reactant temperature. While normal temperature increases can be accommodated with no particular problem, too high of a rate for the exothermic polymerization reaction would cause a significant increase in temperature, especially after the solution has thickened so that heat dissipation is impaired. With increased temperature, further increases in polymerization rate result. This tendency toward "run away" polymerization is greater with a higher concentration of monomers in solution. Higher temperatures can also cause cross-linking of the polymer resulting in polymers of reduced water solubilities and other inferior properties. With most reactant systems it is preferred that the reaction temperature be controlled below about 65° C. Accordingly, it is within the scope of this invention to control the concentration of monomers below the level resulting in excessive temperature increases resulting in "run away" polymerization, and more particularly at temperatures below about 65° C. In most applications, excessive temperatures are not encountered at reactant concentrations below about 30 weight percent monomer mixture. Further, it is within the scope of the invention to cool the reaction mixture sufficiently to prevent excessive temperatures. Although the minimum amount of the organoboron catalyst required to initiate the reaction will depend somewhat on the oxygen content of the system, as hereintofore disclosed, it has nevertheless been found that polymerization of most systems can be initiated at catalyst concentrations of 5–200 p.p.m. of boron based on the weight of monomers present. Since the molecular weights of the various catalysts are different, catalyst additions are conveniently based on boron content, it being understood that different amounts of the various organoboron compounds must be employed to provide equivalent quantities of boron.

Thus, polymeric agents of this invention are produced by dissolving the acrylic monomer, or mixture of monomers, in water and initiating polymerization by introducing a small amount of organoboron catalyst into the reactant solution. The resulting product is a viscous aqueous solution or gel of the polymeric product, the consistency depending upon the initial concentration of monomers and the degree of polymerization. This product is neutralized by the addition of a suitable alkaline material, such as ammonium or alkali metal hydroxide, to form salts of the polymer and the viscous solution diluted to obtain a relatively dilute aqueous polymer solution exhibiting the properties desired for a particular use. Neutralization is facilitated by adding at least a part of the diluent liquid with or prior to the addition of the alkaline agent. Alternatively, the viscous or gelatinous polymer product can be neutralized and dehydrated to obtain a solid polymer that can be stored and transported to a field location as desired. In this latter mode of operation, a flooding medium is prepared by dissolving the solid polymer in water or brine in convention manner.

According to one specific mode of practicing the invention, an aqueous solution containing up to about 50 weight percent of reactant monomers, and more preferably from about 10 to about 30 weight percent of monomers, is charged to a closed reaction vessel. Air is removed from the vessel by purging with a substantially oxygen-free inert gas, such as nitrogen or helium, or by successively evacuating the air space above the liquid and purging with inert gas. A substantially oxygen-free atmosphere is maintained during the reaction to prevent additional quantities of oxygen from being absorbed into the solution. Also, the reactant solution can be stripped of a substantial portion of the dissolved oxygen by passing an oxygen-free inert gas through the liquid. The polymerization reaction is initiated by the injection of the organoboron catalyst, preferably in an amount equivalent to at least 5–200 parts of boron per million parts of monomers. The reactant solution is preferably agitated sufficiently to mix the catalyst into the solution and then agitation is discontinued during the bulk of the reaction period. Agitation can variously be effected by shaking the reaction vessel, by mechanical mixing, or by bubbling a stream of inert gas through the reactant liquid. As hereinabove disclosed, temperatures are desirably controlled below 65° C. during the reaction. The polymerization reaction is complete within a period of several days, and often within a period of a few hours.

Upon completion of the polymerization reaction, or after the polymerization has progressed to the extent that a desirable polymer is obtained, the resulting viscous polymer solution or gel is neutralized by the addition of an alkaline material, and particularly a monovalent alkaline material, such as an alkali metal hydroxide, and in particular sodium or potassium hydroxide, or ammonium hydroxide and the like. Sufficient alkaline material can be added in this step to adjust the pH of the resultant solution to a value of 8–9, or only a portion of the alkaline material can be added at this point and the final pH adjustment made after dilution. Alternatively, some of all of the aqueous diluent can be added with or prior to the addition of the alkaline material. The resulting neutralized polymer solution can be diluted with water or brine to obtain a viscous aqueous flooding material having the degree of mobility desired for a particular flooding application. These desired flooding solutions usually contain between about 0.002 to about 0.5 weight percent polymer, although solutions containing more or less polymer can be employed where desired. Further, additional agents, such as bacteriocides and corrosion inhibitors, can be incorporated into the flooding solution, if desired.

The organoboron catalysts useful in the practice of this invention are for the most part oleaginous materials having limited solubility in water. This property of the catalyst limits its effectiveness as undissolved droplets of the organoboron compound accumulate in the aqueous reactant solution and do not readily contribute to the polymerization. More efficient dispersion of the catalyst can be achieved by first dissolving the catalyst in a mutual solvent which is miscible with water, at least in the range of concentrations encountered. Suitable solvents for the organoboron catalysts, and in particular for the preferred trialkylboron catalysts, which are also miscible with water include dioxane, dimethylsulfoxide, and low molecular weight alcohols and ketones. The catalyst is dissolved in a convenient volume of solvent and this solution added to the reactant monomer solution to initiate the polymerization reaction. Although the concentration of the catalyst in the solution is not critical, this solution can conveniently contain from about 5 to about 50 parts of an organoboron compound, such as trialkylboron, per part of solvent.

Also, certain of the trialkylborons are sufficiently volatile that they can be added to the reactant monomer solution in vapor form. Thus, particularly in the case of those trialkylborons containing primarily methyl and ethyl substituent groups, the catalyst can be vaporized and contacted with the monomer solution by bubbling the catalyst vapor into the reactant solution. Alternatively, catalyst vapor can be admixed with an inert carrier gas, such as helium or nitrogen, and bubbled into the monomer solution. With this mode of catalyst addition it may be advantageous to recycle the inert gas to avoid the loss of catalyst in the gas exiting the solution.

The invention can be illustrated further by the following examples which are illustrative of specific modes of practicing the invention and are not intended as limiting the scope of the invention as defined by the appended claims.

EXAMPLE 1

A reactant solution is prepared by dissolving 4.05 parts by weight of acrylic acid, 9.45 parts by weight of acrylamide and 1.5 parts by weight of diacetone acrylamide in 85 parts by weight water. The reactant solution is placed in a closed vessel and the vessel is evacuated and purged with helium. A helium blanket is maintained in the vessel during the reaction. Copolymerization of the reactants is initiated by the addition of a solution of triethylboron in dioxane. Upon completion of the reaction, the gelatinous product is diluted with 3 percent by weight sodium chloride solution and neutralized to pH 9 with sodium hydroxide. This polymer concentrate is used to prepare a series of dilute polymer solutions in 3 percent brine having different concentrations of terpolymer.

The Brookfield viscosity and resistance factor of the test solutions are determined by conventional techniques. These results are compared with the viscosity and resistance factor of 3 percent brine solutions of a partially hydrolyzed polyacrylamide marketed by the Dow Chemical Company under the trademark Pusher 500. The results of these tests are reported in Table 1.

TABLE 1.—COMPARISON OF ACRYLIC ACID-ACRYLAMIDE-DIACETONE ACRYLAMIDE TERPOLYMER AND PARTIALLY HYDROLYZED POLYACRYLAMIDE

| Polymer type | Polymer concentration, p.p.m. | Brookfield viscosity, cp. at 30 r.p.m. | Resistance factor |
|---|---|---|---|
| Pusher 500 [1] | 500 | 1.6 | 6.5 |
| | 250 | 1.4 | 4.3 |
| | 125 | 1.3 | 3.0 |
| | 62.5 | | 2.1 |
| AADA [2] | 500 | 6.4 | 30.6 |
| | 250 | 3.2 | 24.6 |
| | 125 | 1.8 | 18.7 |
| | 62.5 | 1.4 | 14.3 |
| | 15.3 | | 6.00 |

[1] Partially hydrolyzed polyacrylamide marketed by the Dow Chemical Company under the trademark Pusher 500.
[2] Acrylic acid-acrylamide-diacetone acrylamide terpolymer.

EXAMPLES 2-9

A number of polymerizations are conducted with different monomer compositions and with varied reaction conditions. The monomer composition is varied from about 10–50 weight percent acrylic acid, 25–85 weight percent acrylamide, and 1–25 weight percent diacetone acrylamide. The concentration of monomers in the reactant solution is varied from about 10–30 weight percent. The amount of oxygen present in the reactant solution is controlled at varying levels by employing different methods of oxygen control. Catalyst types, concentrations and addition methods are varied. The monomer composition, reaction conditions, and the nature of the product are set forth in Table 2 for each of the runs.

TABLE 2

| | Monomer composition, wt. percent | | | Monomer concentration, wt. percent | Method of oxygen control [2] | Catalyst | | | |
|---|---|---|---|---|---|---|---|---|---|
| | Acrylic acid | Acrylamide | DAA [1] | | | Type [3] | Carrier | Concentration, p.p.m. [5] | Product |
| Example number: | | | | | | | | | |
| 2 | 10 | 85 | 5 | 10 | C | TEB | None | 20 | Gel. |
| 3 | 25 | 65 | 10 | 15 | B | TBB | Dioxane | 40 | Gel. |
| 4 | 50 | 25 | 25 | 20 | C | TPB | DMSO [4] | 80 | Gel. |
| 5 | 15 | 75 | 10 | 25 | C | TMB | Helium gas | 10 | Gel. |
| 6 | 40 | 45 | 15 | 30 | C | TBB | None | 5 | Gel. |
| 7 | 27 | 63 | 10 | 15 | A | TEB | Dioxane | 40 | No polymer. |
| 8 | 27 | 63 | 10 | 15 | A | TEB | do | 80 | Viscous liquid. |
| 9 | 27 | 63 | 10 | 15 | A | TEB | do | 200 | Gel. |

[1] Diacetone acrylamide.
[2] A = No oxygen control; B = helium bubbled through solution; C = evacuation and helium blanketing.
[3] TMB = Trimethylboron; TEB = triethylboron; TPB = tripropylboron; TBB = tri(n-butyl)boron.
[4] DMSO = Dimethyl sulfoxide.
[5] Catalyst concentration expressed as parts of boron per million parts of monomer.

Various embodiments and modifications of this invention have been described in the foregoing description and examples, and further modifications will be apparent to those skilled in the art. Such modifications are included within the scope of this invention as defined by the following claims.

Having now described the invention, I claim:

1. An acrylic acid-acrylamide-diacetone acrylamide terpolymer represented by the generalized formula

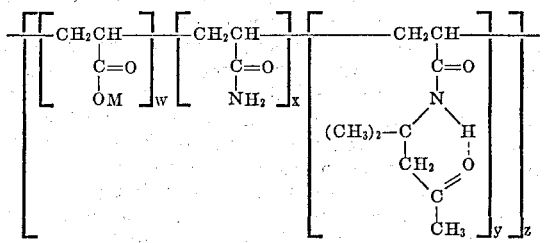

wherein M is a cation; $w$, $x$ and $y$ represent respectively the average number of acrylic acid monomer units, acrylamide monomer units and diacetone acrylamide monomer units in the polymer per 100 monomer units of the polymer, the sum of $w$, $x$ and $y$ totaling 100; $z$ represents the average number of 100 monomer units in the polymer; and the polymer is characterized by a viscosity of at least about 3 centipoises for a 0.05 percent by weight solution thereof in an aqueous 3 percent by weight sodium chloride solution at 25° C. as determined with a Brookfield viscosimeter equipped with a UL adapted spindle and operated at 30 r.p.m.

2. The composition of claim 1 wherein $w$ is from about 10–50, $x$ is from about 25–85, $y$ is from about 1–25, and $z$ varies up to about 8000.

3. The composition of claim 1 wherein M is a monovalent cation selected from the group consisting of hydrogen, ammonium and alkali metals; $w$ is from about 15–35, $x$ is from about 45–80, $y$ is from about 2–15, and $z$ varies up to about 8000.

4. The composition of claim 1 which is further characterized by a resistance factor of at least about 15 for a 0.05 percent by weight solution thereof in an aqueous 3 percent by weight solution of sodium chloride at 25° C.

5. An acrylic acid-acrylamide-diacetone acrylamide terpolymer consisting essentially of copolymerized acrylic acid, acrylamide and diacetone acrylamide in the molar proportions of about 10–50 parts of acrylic acid, 25–85 parts of acrylamide and 1–25 parts of diacetone acrylamide per 100 parts of the monomers, said terpolymer being characterized by (1) a viscosity of at least about 3 centipoises for a 0.05 percent by weight solution thereof in an aqueous 3 percent by weight sodium chloride solution at 25° C. as determined with a Brookfield viscosimeter equipped with a UL adapter spindle and operated at 30 r.p.m., and (2) a resistance factor of at least about 15 for a 0.05 percent by weight solution thereof in an aqueous 3 percent by weight solution of sodium chloride at 25° C.

6. A method for preparing acrylic acid-acrylamide-diacetone acrylamide terpolymer, which comprises contacting an aqueous solution containing about 10 to about 30 weight percent of a mixture of acrylic acid, acrylamide and diacetone acrylamide monomers with a trialkylboron catalyst having the following generalized formula

wherein $R_1$, $R_2$ and $R_3$ are alkyl radicals containing up to four carbon atoms, and wherein said catalyst is employed in an amount equivalent to about 5–200 parts of boron per million parts of monomers sufficient to copolymerize said monomers.

7. The method defined in claim 6 wherein said monomers are in the proportion of about 10–50 parts of acrylic acid, 25–85 parts of acrylamide, and 1–25 parts of diacetone acrylamide per 100 parts by weight of monomer mixture.

8. The method defined in claim 6 wherein said monomers are in the proportion of about 15–35 parts of acrylic acid, 45–80 parts of acrylamide, and 2–15 parts of diacetone acrylamide per 100 parts by weight of monomer mixture.

9. The method defined in claim 6 wherein said copolymerization is conducted in an atmosphere substantially free of undissolved oxygen.

10. The method defined in claim 6 wherein said trialkylboron catalyst is added to said aqueous solution of monomers as a solution of the catalyst dissolved in a solvent miscible with water.

11. The method defined in claim 10 wherein said solvent is dioxane.

12. The method defined in claim 6 including the step of neutralizing said polymeric product.

13. The method defined in claim 12 including the additional steps of drying and particulating said polymeric product to obtain a solid granular polymer.

14. A method for preparing acrylic acid-acrylamide-diacetone acrylamide copolymers, which comprises:
preparing an aqueous solution of about 10–30 weight percent of a mixture of acrylic monomers dissolved in water, said monomers being in the proportion of about 15–35 parts of acrylic acid, 45–80 parts of acrylamide and 2–15 parts of diacetone acrylamide per 100 parts by weight of monomer mixture;
removing a major portion of the undissolved oxygen in contact with said monomer solution from contact therewith;
adding to said monomer solution a second solution of a trialkylboron compound dissolved in dioxane in an amount equivalent to about 5–200 parts of boron per million parts of monomer sufficient to cause the copolymerization of said monomers whereby a polymeric product is formed, said trialkylboron compound having the general formula

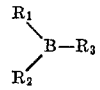

wherein $R_1$, $R_2$ and $R_3$ are alkyl radicals containing up to four carbon atoms; and
neutralizing said polymeric product to a pH of about 8–9.

15. The method defined in claim 14 including the step of drying the polymeric product to obtain a solid polymer.

16. The method defined in claim 14 including the step of particulating said solid polymer.

17. The method defined in claim 14 wherein said polymeric product is diluted with an aqueous liquid to obtain a dilute aqueous solution of said polymer.

References Cited

UNITED STATES PATENTS

| | | | |
|---|---|---|---|
| 3,493,500 | 2/1970 | Volk et al. | 210—54 |
| 3,497,467 | 2/1970 | Coleman | 260—29.6 |
| 2,985,633 | 5/1961 | Welch | 260—85.3 |
| 3,277,056 | 10/1966 | Coleman | 260—63 |
| 3,451,480 | 6/1969 | Zeh et al. | 166—308 |

FOREIGN PATENTS

| | | | |
|---|---|---|---|
| 1,206,042 | 2/1960 | France | 260—80 |

JOSEPH L. SCHOFER, Primary Examiner

S. M. LEVIN, Assistant Examiner

U.S. Cl. X.R.

260—66, 80.3 N, 80.72, 80.73, 89.7 R, 89.7 S